(12) United States Patent
Carvalho-de-Souza et al.

(10) Patent No.: US 12,458,697 B2
(45) Date of Patent: Nov. 4, 2025

(54) METHODS TO RESCUE LIGHT SENSITIVITY IN RETINAS AFTER PHOTORECEPTOR DEGENERATION

(71) Applicants: ARIZONA BOARD OF REGENTS ON BEHALF OF THE UNIVERSITY OF ARIZONA, Tucson, AZ (US); THE UNIVERSITY OF CHICAGO, Chicago, IL (US)

(72) Inventors: Joao Carvalho-de-Souza, Tucson, AZ (US); Francisco Bezanilla, Chicago, IL (US)

(73) Assignees: ARIZONA BOARD OF REGENTS ON BEHALF OF THE UNIVERSITY OF ARIZONA, Tucson, AZ (US); THE UNIVERSITY OF CHICAGO, Chicago, IL (US)

( * ) Notice: Subject to any disclaimer, the term of this patent is extended or adjusted under 35 U.S.C. 154(b) by 792 days.

(21) Appl. No.: 17/857,818

(22) Filed: Jul. 5, 2022

(65) Prior Publication Data
US 2023/0000985 A1    Jan. 5, 2023

Related U.S. Application Data

(60) Provisional application No. 63/218,092, filed on Jul. 2, 2021.

(51) Int. Cl.
*A61K 41/00*     (2020.01)
*A61N 5/06*     (2006.01)

(52) U.S. Cl.
CPC ........ *A61K 41/0057* (2013.01); *A61N 5/0622* (2013.01)

(58) Field of Classification Search
None
See application file for complete search history.

(56) References Cited

U.S. PATENT DOCUMENTS

2009/0011040 A1 * 1/2009 Naash .................. A61K 9/0048
                                                     977/773
2015/0328313 A1 * 11/2015 Chow ................ A61K 41/0023
                                                     435/173.5

* cited by examiner

*Primary Examiner* — Linda C Dvorak
*Assistant Examiner* — Nicholas S Borsch
(74) *Attorney, Agent, or Firm* — NGUYEN TARBET IP LAW

(57) ABSTRACT

The present invention is directed to the use of gold nanoparticles to enable vision in the visually impaired. Retinal neurons remain functional despite photoreceptor degeneration. These neurons can be made light-sensitive to produce action potentials, by gold nanoparticles conjugated to high-avidity ligands for a variety of cellular targets. Once bound to a neuron, these particles transduce millisecond pulses of light into heat, which changes membrane capacitance, depolarizing the cell and eliciting action potentials. The technology described herein along with a camera and decoder can be used to aid the visually impaired by stimulating cells to send the appropriate messages to the visual cortex.

20 Claims, 5 Drawing Sheets

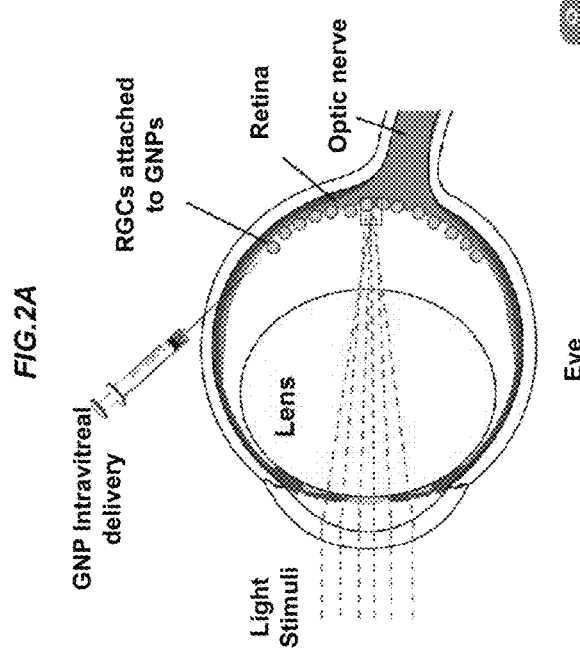
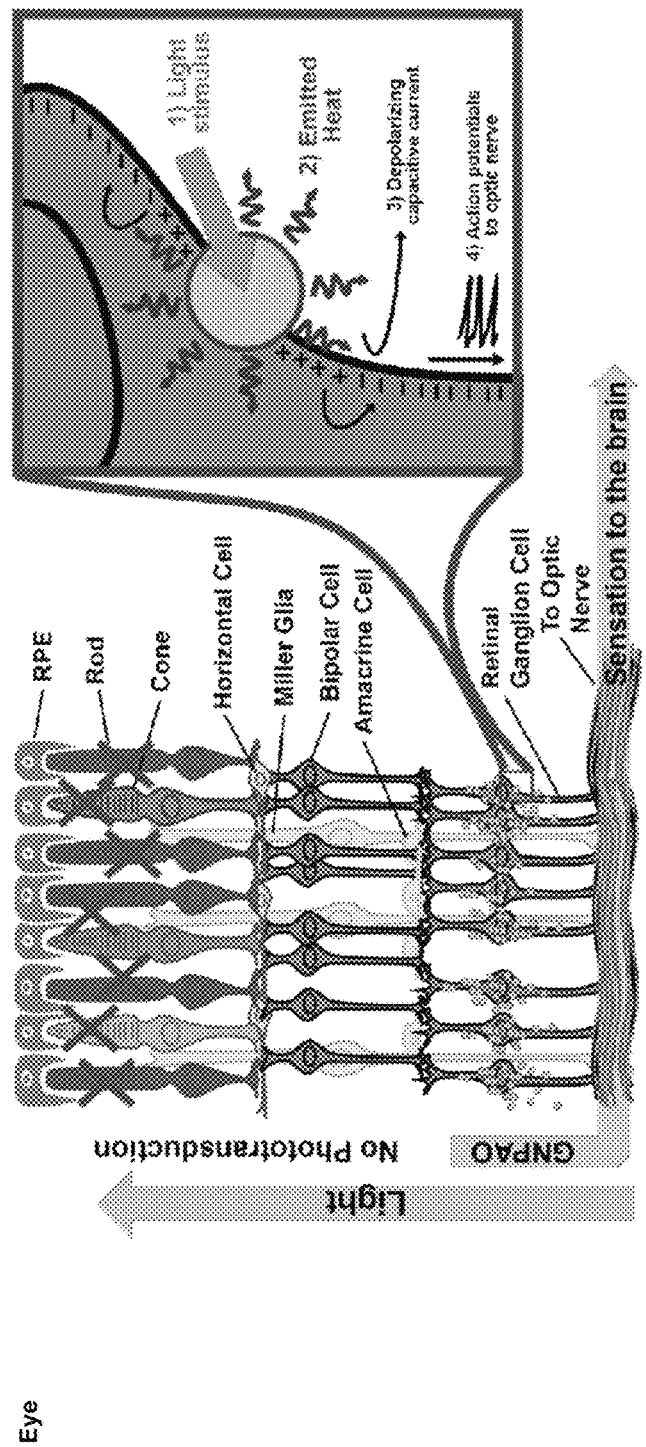
FIG.2A
FIG.2B

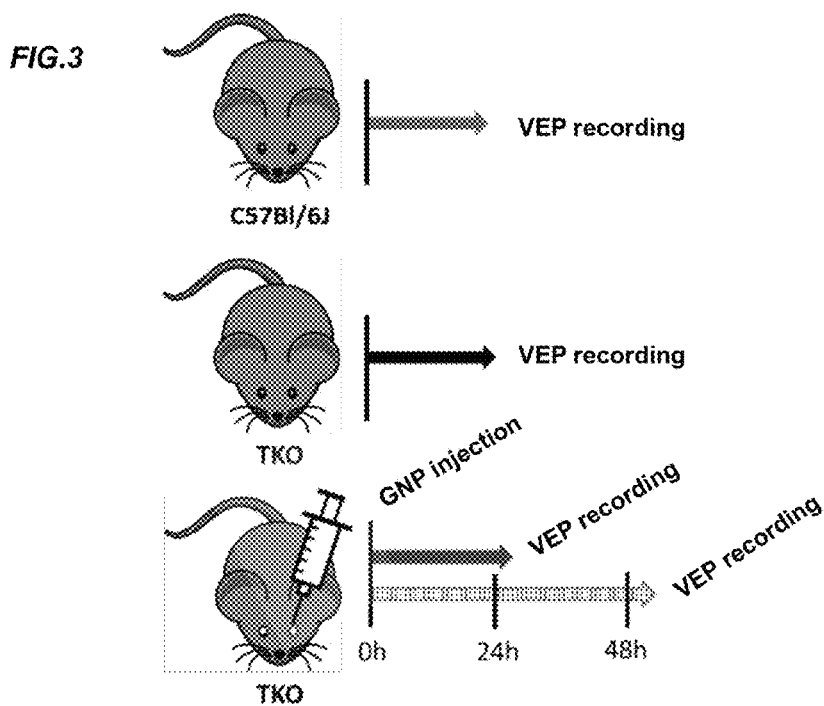
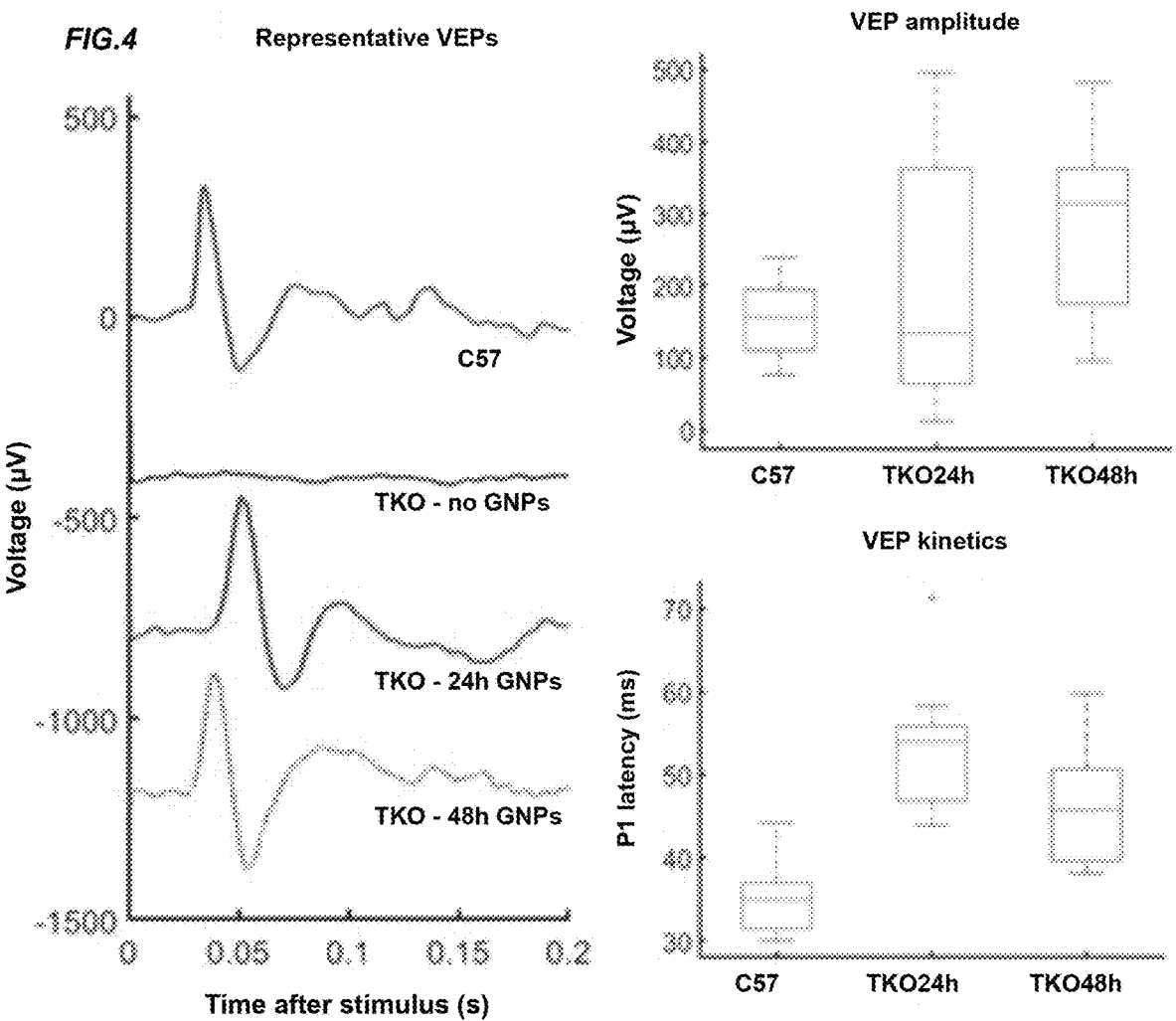

METHODS TO RESCUE LIGHT SENSITIVITY IN RETINAS AFTER PHOTORECEPTOR DEGENERATION

CROSS-REFERENCES TO RELATED APPLICATIONS

This application is a non-provisional and claims benefit of U.S. Provisional Application No. 63/218,092 filed Jul. 2, 2021, the specification of which is incorporated herein in its entirety by reference.

FIELD OF THE INVENTION

The present invention features methods for treating vision loss caused by photoreceptor degeneration, specifically through light-to-heat transducer materials (e.g., gold nanoparticles) that allow for re-establishing photosensitivity of retina cells.

BACKGROUND OF THE INVENTION

Figure 1A:
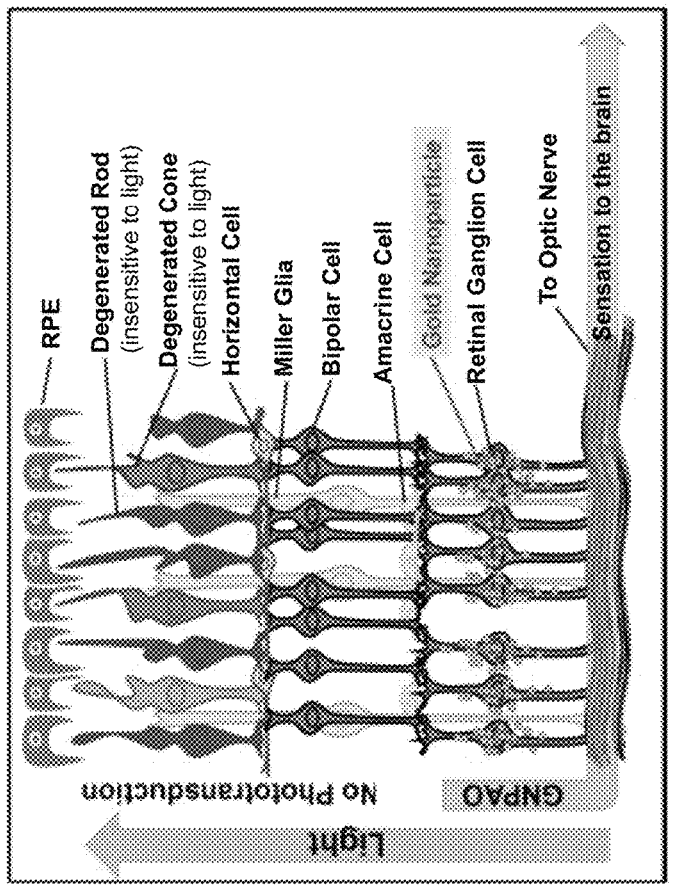

Sight is one of the human five basic senses. With sight, it is possible to map the area around us as soon as the radiation produced, refracted, scattered, or reflected by any object can reach our eyes. The eyes are optic chambers with lensing capability that focus (i.e., compress) and represent the field of view on a highly specialized tissue, the retina, in the back of the eye. The retina is a multi-layered, cellular structure that can transform focused fields of view into a transmittable signal and deliver it to the lateral geniculate nucleus, where the optic nerve makes synapsis. From there, nerve fibers (i.e., axons) irradiate to the visual cortices areas where visual data is processed to produce appropriate responses. In the retina, the cells responsible for primary light sensitivity are the photoreceptors. The photoreceptors are the cells that transduce light into synaptic signals and ultimately into action potentials propagated by the optic nerve to those areas in the brain (FIG. 1A). The retina is mapped in the visual cortex so that the focused field of view that stimulates the retina is represented in the visual cortex.

Blindness is the inability to see. Part of the causes of blindness in humans is due to malfunction or degeneration of the photoreceptors. Once photoreceptors cannot transduce light into cell signals (synaptic signals and/or action potentials), blindness occurs. Some well characterized human diseases lead to permanent blindness by photoreceptor degeneration. For example, age-related macular degeneration (AMD) is a primarily metabolic disease that causes photoreceptor loss in the fovea, a region in the retina that produces accurate vision. Age-related macular degeneration is more prevalent in individuals 65 years of age and older, and therefore it is a significant concern because of population aging. Retinitis pigmentosa is a progressive, genetic disease that also causes photoreceptor degeneration with an overall prevalence of 1 in every 4,000 globally.

Once the photoreceptors have degenerated, light sensitivity cannot be recovered by any currently approved treatment. However, experimental techniques under development shed light on the problem. These experimental techniques aim to generate photoreceptors surrogates based on other cells in the retina. The often-targeted cells are the retinal ganglion cells (RGCs), which give rise to the axons that form the optic nerve. The premise is that by photo stimulating RGCs directly, the optic nerve would propagate the generated signals (action potentials) to the regions in the brain, ultimately to the visual cortex, and some sight would be able to be perceived. One of those techniques employs an intraocular implanted circuit chip containing electronics to transduce light into electrical signals to be directly delivered to the RGCs by some spiky structures that connect to these cells. However, the chip implantation requires major eye surgery and is susceptible to rejection or retinal damage following the procedure, representing a barrier to broadly employing this technique in humans. Another promising technique that enables photosensitivity to RGCs uses bioengineered light-sensitive proteins (i.e., channelrhodopsins) that make RGCs work as photoreceptors. The technique takes advantage of the well-known optogenetics technique based on viral infection of the host cells (i.e., RGCs), aiming to deliver a gene encoding channelrhodopsin. Theoretically, a promoter match would enable the expression of the coded protein only by a specific cell type (i.e., RGCs). This technique, however, suffers from likely immune rejection and the necessity of genetic manipulation of cells in the human eye. Therefore, developing new techniques and methods to bypass degenerated photoreceptors and restore sight is needed in a helpful extension.

BRIEF SUMMARY OF THE INVENTION

It is an objective of the present invention to provide methods and compositions that allow for non-genetic methods for the treatment of vision loss caused by photoreceptor degeneration, as specified in the independent claims. Embodiments of the invention are given in the dependent claims. Embodiments of the present invention can be freely combined with each other if they are not mutually exclusive.

In some aspects, the present invention is directed to the use of gold nanoparticles (or other light-to-heat transducer materials) to enable vision in the visually impaired. Retinal neurons can be directly stimulated with light to produce action potentials by gold nanoparticles conjugated to high-avidity ligands for various cellular targets. Once bound to a neuron, these particles transduce millisecond pulses of light into heat, which changes membrane capacitance, depolarizing the cell and eliciting action potentials. Compared to non-functionalized nanoparticles, ligand-conjugated nanoparticles highly resist convective washout and enable photothermal stimulation with lower delivered energy resulting in lower temperature increases over time. This technology, along with a camera and decoder, can aid the visually impaired by stimulating cells to send the appropriate messages to the visual cortex.

In some embodiments, the present invention features a method of treating vision loss caused by photoreceptor degeneration and/or a method of establishing photosensitivity in retina cells in a subject in need thereof. The method may comprise introducing a light-to-heat transducer material (e.g., a gold nanoparticle) comprising an anchoring molecule to an eye of the patient and pulsing a light source into the eye of the patient.

In other embodiments, the method for treating vision loss caused by photoreceptor degeneration and/or a method of establishing photosensitivity in retina cells in a subject in need thereof may comprise introducing gold nanoparticles comprising an anchoring molecule to an eye of the patient and pulsing a light source into the eye of the patient.

One of the unique and inventive technical features of the present invention is the use of a light-to-heat transducer material (e.g., gold nanoparticles) along with a light pulsing source. Without wishing to limit the invention to any theory or mechanism, it is believed that the technical feature of the present invention advantageously provides for a non-genetic method for treating vision loss caused by photoreceptor degeneration. Additionally, the flexibility of gold nanoparticles, spherical or cylindrical, to be used as light absorbers contrasts with other methods to provide light sensitivity to cells. Furthermore, gold nanoparticles are readily available by synthesis from research labs. Notably, gold nanoparticles are also fully biocompatible and have been approved for human usage by the FDA. None of the presently known prior references or work has the unique, inventive technical feature of the present invention.

Furthermore, the prior references teach away from the present invention. For example, optogenetics that uses algae channelrhodopsins performs poorly with red-shifted light wavelengths. Additionally, these studies targeting the retinal ganglion cells use a viral vector containing the genetic code for a channelrhodopsin (an ion channel gated by light) to genetically modify the retinal ganglion cells (RGCs).

Furthermore, the inventive technical features of the present invention contributed to a surprising result. For example, light pulses as short as 100 microseconds can produce activation in cortical neurons. These very short pulses allow for a high frequency pulsed light stimulation (e.g., 20 Hz) and yet a very short duty cycle (e.g., 0.2%). In other words, even at a 20 Hz light stimulation that can enable natural movement vision 99.8% of the time (49.9 milliseconds), the retina will not be receiving light, which is advantageous for heat dissipation.

In some embodiments, the present invention features a method for optocapacitance (i.e., a non-genetic technique) to re-enable photosensitivity on the degenerated or damaged retina. Optocapacitance is a recently discovered phenomenon whereby a brief pulse of heat changes the membrane temperature by less than 2 degrees Celsius, which changes the membrane capacitance at the proportion of 1 C/1% increase in membrane capacitance. Quickly increased capacitance changes the membrane potential (depolarization). The present invention harnesses this knowledge to be used in the eye to activate light cells that are not naturally photosensitive, therefore re-enabling photosensitivity to retinas after photoreceptor degeneration or damage.

A crucial variation of this technique is the possibility of expanding the visible spectrum to include near-infrared wavelengths. Gold nanoparticles or other light-to-heat transducer materials described herein can readily absorb radiation in the range of 1,000 nm and transduce the light energy into heat in a helpful manner for the optocapacitive effect described herein. The present invention is not limited to vision restoration and may also be used to improve normal vision as well.

Additionally, no continuous light is needed for the methods described herein to work and produce suprathreshold depolarizations in the RGCs membranes. A hundred microseconds laser pulse is enough to generate the visual cortex's neurons to be activated. The laser power for this case is around 700 mW, which gives a total energy of 70 microJoules. This energy is way smaller than lasers used in ophthalmology during eye procedures. Nevertheless, this level of energy may change when fine-tuning the method in humans.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

Figure 1B:
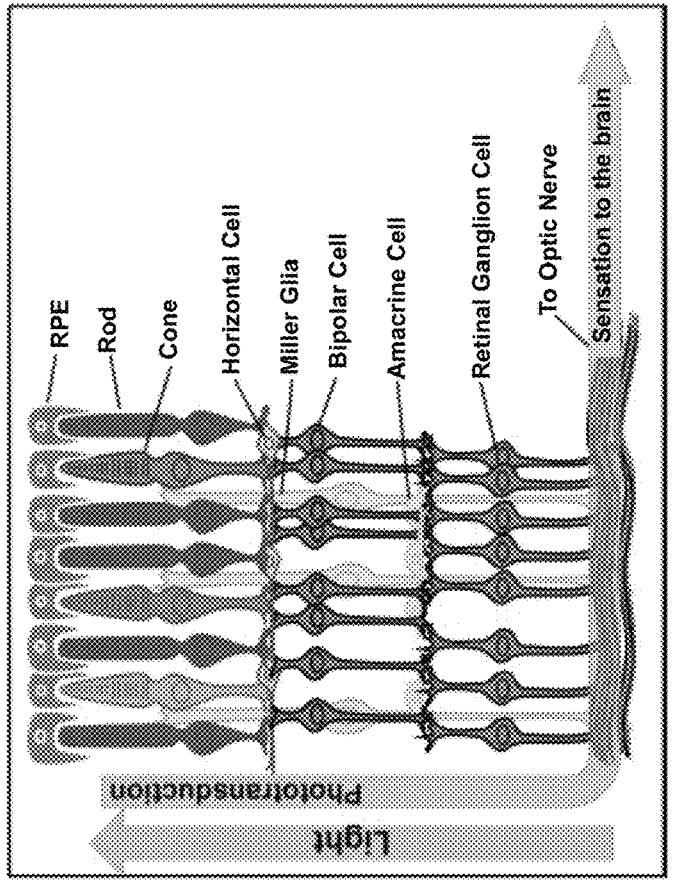

The features and advantages of the present invention will become apparent from a consideration of the following detailed description presented in connection with the accompanying drawings in which:

FIGS. 1A and 1B show gold-nanoparticles-assisted optocapacitance (GNPAO) to re-enable photosensitivity in photoreceptor degenerated retinas. FIG. 1A shows a schematic of normal retina phototransduction, indicating the primary retina cells involved in the process. FIG. 1B shows photoreceptors-degenerated retina, as in cases of AMD and RP diseases, indicating impaired phototransduction at the photoreceptors layer. It is also shown in FIG. 1B the strategy described herein to enable photosensitivity to the Retinal Ganglion Cells (RGCs) using GNPAO. With the activation of RGCs by light stimuli using the GNPAO technique, signals (i.e., action potentials) initiated by light will propagate through the optic nerve and reach the brain, re-enabling functional light perception vision. RPE: Retina pigmented epithelium.

FIGS. 2A and 2B show gold-nanoparticles-assisted optocapacitance (GNPAO) applied to retinas in vivo. FIG. 2A shows that gold nanoparticles (GNPs) or gold nanorods (GNRs) are injected into TKO mice eyes for RGC photosensitization. FIG. 2B shows that since there is no phototransduction in the photoreceptors layer of TKO mice retinas (indicated by an X), the optic nerve will propagate only action potentials initiated at the RGCs by the GNPAO mechanism. Inset: 1) Light stimulus, 2) heat emission, 3) depolarization by a capacitive current, and 4) propagation of RGC's action potentials through the optic nerve to the brain. Visual cortex (in the brain) activity is directly recorded electrically as visual evoked potentials (VEPs) (see FIGS. 6, 7A, 7B, 7C, and 7D). A stereotyped behavior (light avoidance) in response to activation of neurons mainly in the visual cortex will be detected by light avoidance behavior tests (see FIGS. 8A and 8B).

FIG. 3 shows the four groups of animals that were compared: wild-type C57Bl/6J mice served as controls and did not receive any injection of GNPs. TKO mice were split into three groups: 1) those that did not receive any injections and those that received an intravitreal injection of GNPs to the left eye and were tested at 2) 24 hours post-injection or 3) 48 hours post-injection.

FIG. 4 shows representative visual evoked potentials (VEPs) elicited by a 0.1 ms 520 nm laser stimulus. The wild-type C57 mouse exhibits a typical VEP waveform, exhibiting distinct P1, N1, and P2 components. In the case of a TKO mouse that has not received any injection of GNPs, no VEP is discernible. None of the untreated TKO elicited a VEP in any of them. In stark contrast, in a TKO mouse that has received GNPs, at either 24 h or 48 h post-injection, there are robust VEPs that resemble those recorded in WT animals. Quantification of VEP amplitude (FIG. 4, top right) shows that the magnitude of VEPs in mice 24 hours after injection of GNPs are comparable to those recorded in C57 mice and in some animals may even be enhanced. These VEPs seem to be relatively stable, as they are still robust at 48 hours post-injection. Interestingly, the kinetics of VEPs recorded in TKO mice (FIG. 4, bottom right) appear to be slightly delayed compared to those recorded in C57 mice.

Figure 5:
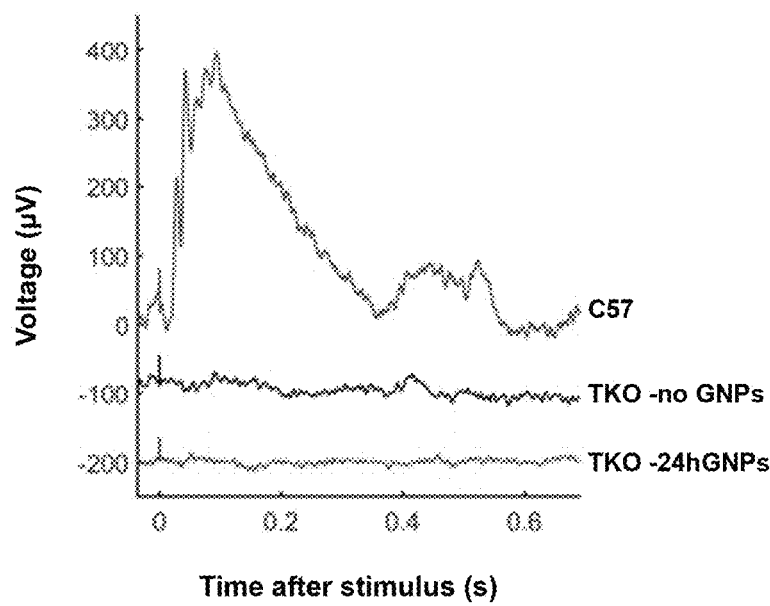

FIG. 5 shows representative traces obtained in each group. In C57 mice, a large waveform consisting of the typical A- and B-wave is clearly visible, which suggests photoreceptor and bipolar cell activation. Also, present along the rising edge of the B-wave is oscillatory potentials, reflecting the activity of inhibitory interneuron populations of the retina. In stark contrast, no ERG waveform was detectable in traces from TKO mice, regardless of whether GNPs had been injected.

Figure 6:
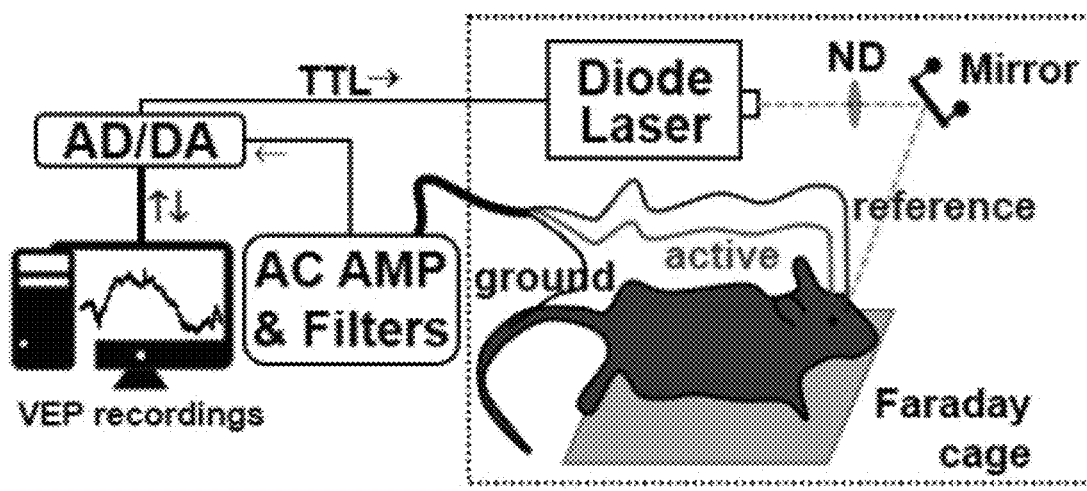

FIG. 6 shows an in-house VEP recording system for anesthetized mice. A laser diode (520 nm or 808 nm) is used as a source for light stimulations. These laser diodes will be transistor-transistor logic (TTL)-triggered by the analog-to-digital and digital-to-analog (AD/DA) converter of the system. Differential signals collected from the top of the visual cortex (active electrode) relative to the reference electrode placed rostral to the bregma reference point in the mice's skull will be filtered and amplified by an AC amplifier (AC AMP), then digitized and recorded in a hard drive of a personal computer. For body temperature control, the mice will be placed on a temperature-controlled surface (Heating pad, gray surface under the represented mice). The entire acquisition system, including the mouse, is placed inside a Faradays' cage for noise shielding.

Figure 7A:
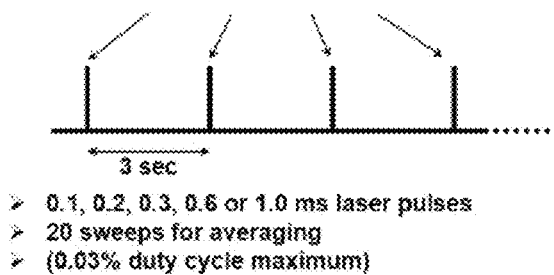
Figure 7C:
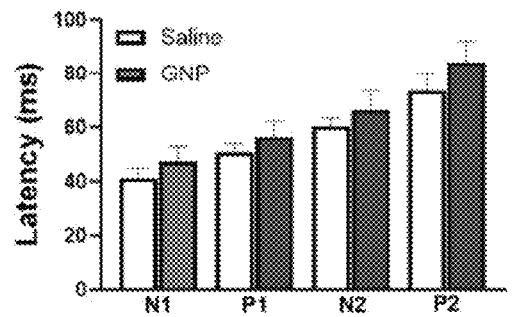
Figure 7B:
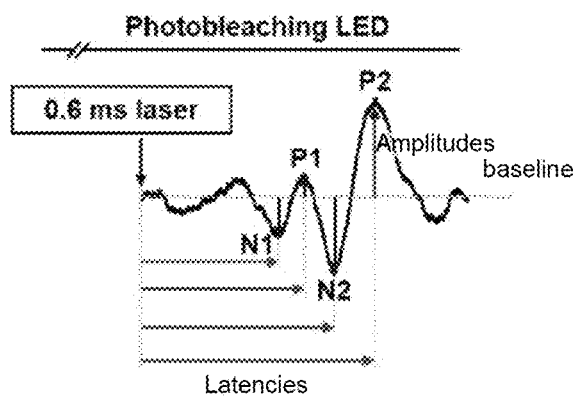
Figure 7D:
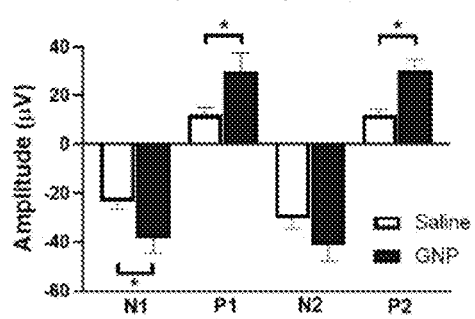

FIGS. 7A, 7B, 7C, and 7D show VEPs parameters studied in the work described herein. FIG. 7A shows a light stimulation protocol schematics showing laser pulses (arrows on top; 0.1-1.0 ms) delivered every 3 seconds in batches of 20 repetitions for the signal averaging procedure. The duration of the pulses relative to the repetition rate of 0.33 Hz results in a duty cycle of 0.03% maximum, avoiding heat buildup. FIG. 7B shows a typical VEP waveform recorded from regular C57 mice under photobleaching conditions produced by a steady LED used as a light source, depicting the parameters to be analyzed from similar waveforms to be recorded from TKO mice: latencies of four peaks, two negatives (N1 and N2) and two positives (P1 and P2). From the analysis of VEP signals recorded from seven mice treated with GNP intravitreally and another seven mice treated with saline only, the latencies are not significantly changed by the presence of GNP in the vitreous chamber (FIG. 7C). However, the amplitudes of N1, N2, and P2 are significantly increased by the presence of GNP intravitreally (FIG. 7D).

Figure 8A:
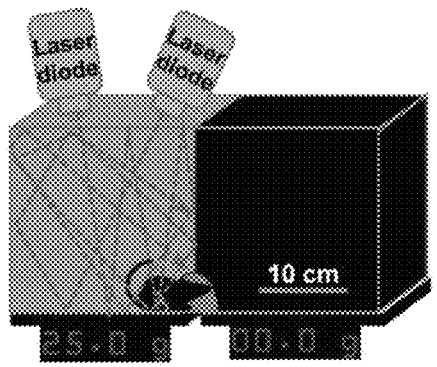
Figure 8B:
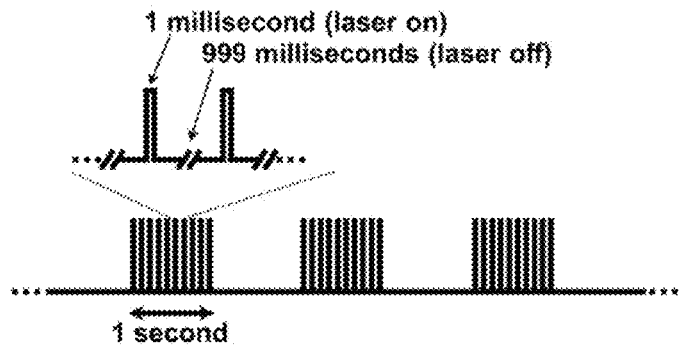

FIGS. 8A and 8B show an in-house dark/light box for light avoidance behavioral tests with mice. FIG. 8A shows that the light side of the box will have attached two or more laser systems (light stimuli sources), and its interior is covered with reflective material. FIG. 8B shows light stimuli will be delivered by two synchronized laser diodes as 10-pulse trains with a 1-second duration, starting every 1 second. The laser pulses within the train will have ~1.0 ms duration, resulting in a 0.1% duty cycle maximum within the train. The two chambers will be connected by a small aperture at the level of their floors for free mouse movement between them. Each chamber will have a scale on the bottom so that the mice's position can be remotely monitored from outside during the experiment.

DETAILED DESCRIPTION OF THE INVENTION

Before the present compounds, compositions, and/or methods are disclosed and described, it is to be understood that this invention is not limited to specific synthetic methods or to specific compositions, as such may, of course, vary. It is also to be understood that the terminology used herein is for the purpose of describing particular embodiments only and is not intended to be limiting.

The present invention features a genetic-free technology that enables photosensitivity to unmodified neurons by using fully biocompatible materials such as gold nanoparticles. Neurons in the retina that are reachable by visible photons can be activated by light after receiving gold nanoparticles treatment to re-enable useful vision after photoreceptors generation that caused blindness.

A "subject" is an individual and includes, but is not limited to, a mammal (e.g., a human, horse, pig, rabbit, dog, sheep, goat, non-human primate, cow, cat, guinea pig, or rodent), a fish, a bird, a reptile or an amphibian. The term does not denote a particular age or sex. Thus, adult and newborn subjects, as well as fetuses, whether male or female, are intended to be included. A "patient" is a subject afflicted with a disease or disorder.

The terms "treating" or "treatment" refer to any indicia of success or amelioration of the progression, severity, and/or duration of a disease, pathology or condition, including any objective or subjective parameter such as abatement; remission; diminishing of symptoms or making the injury, pathology or condition more tolerable to the patient; slowing in the rate of degeneration or decline; making the final point of degeneration less debilitating; or improving a patient's physical or mental well-being.

The terms "administering" and "administration" refer to methods of providing a pharmaceutical preparation to a subject. Such methods are well known to those skilled in the art and include, but are not limited to, administering the compositions via injection (e.g., subretinally or intravitreally).

Referring now to FIGS. 1A-8B, the present invention features methods for a non-genetic treatment of vision loss in a subject in need thereof.

The present invention features a method of treating vision loss caused by photoreceptor degeneration in a subject in need thereof. The method may comprise introducing a light-to-heat transducer material (e.g., a gold nanoparticle) comprising an anchoring molecule to an eye of the patient and pulsing a light source into the eye of the patient. In some embodiments, the pulsing light is absorbed by the light-to-heat transducer material and stimulates a change in membrane capacitance to elicit a cell signal.

The present invention may also feature a method of establishing photosensitivity in retina cells in a subject in need thereof. The method may comprise introducing a light-to-heat transducer material (e.g., a gold nanoparticle) comprising an anchoring molecule to an eye of the patient and pulsing a light source into the eye of the patient. In some embodiments, the pulsing light is absorbed by the light-to-heat transducer material and stimulates a change in membrane capacitance to elicit a cell signal.

As used herein, a "light-to-heat transducer material" refers to any material capable of absorbing light and converting the light energy into heat.

In some embodiments, the light-to-heat transducer material is a gold nanoparticle. In some embodiments, the gold nanoparticle is spherical. In other embodiments, the gold nanoparticle is cylindrical. In other embodiments, the gold nanoparticles comprise both spherical gold nanoparticles and cylindrical gold nanoparticles. In some embodiments, the gold nanoparticle comprises a spherical gold nanoparticle, a cylindrical gold nanoparticle, or a combination thereof.

In some embodiments, the light-to-heat transducer material is a silicon-based material (e.g., an amorphous silicon). In some embodiments, the light-to-heat transducer material is carbon. In other embodiments, the light-to-heat transducer material is a carbon nanotube. In further embodiments, the light-to-heat transducer material is graphite. In some embodiments, the light-to-heat transducer material is graphene.

In some embodiments, the cell signal is a synaptic signal. In other embodiments, the cell signal is an action potential.

Since the biological milieu of living tissues has high water concentration and water is an excellent heat absorber, the gold nanoparticles must be placed at a very close distance from cell membranes to minimize the distance required for heat diffusion from the gold nanoparticle to the cell membrane where the heat will cause a temperature increase.

Therefore, in some embodiments, the light-to-heat transducer material comprises an anchoring molecule. As used herein, an "anchoring molecule" refers to a molecule that attaches the light-to-heat transducer material (e.g., a gold nanoparticle) to a molecule in the membrane of the target cell. In some embodiments, the anchoring molecule is a primary antibody. In some embodiments, the primary antibody is against a membrane protein expressed by a target cell. In some embodiments, the target cell is retinal ganglion cells (RGCs). In other embodiments, the target cell is a bipolar cell (e.g., bipolar cells in the retina). In other embodiments, the anchoring molecule is cholesterol. Without wishing to limit the present invention, it is believed that when cholesterol is attached to a light-to-heat transducer material (e.g., a gold nanoparticle), the light-to-heat transducer material comprising an anchoring molecule (i.e., cholesterol) will enter the membrane and keep the light-to-heat transducer material (e.g., a gold nanoparticle) close to the membrane for light stimulation.

In some embodiments, the anchoring molecule is attached to the light-to-heat transducer material via a linker. In some embodiments, the linker is a polyethylene glycol (PEG) linker. In other embodiments, the linker is a polyethylene glycol polymer linker. In some embodiments, the link is polyethylene glycol 2000 (PEG 2000). Without wishing to limit the present invention to any theory or mechanism it is believed the PEG is an inert piece of a molecule that bridges the light-to-heat transducer material (e.g., the gold nanoparticle) to the anchoring molecule. In some embodiments, the linker may comprise a peptide linker. In other embodiments, the linker may comprise an inert molecule.

In some embodiments, the optocapacitance (i.e., the methods described herein) is an effect crucially dependent on the distance between the heat source (e.g., the gold nanoparticles) and the membranes of the target cells. The heat generated by the gold nanoparticles must diffuse through the aqueous extracellular space to reach the membrane and change its temperature. The speed of change in membrane temperature increases as the distance decreases. Therefore, in some embodiments, an effective anchoring molecule greatly boosts the optocapacitive effect since it keeps the gold nanoparticles attached to the target cell (e.g., the retinal ganglion cells). Additionally, in some embodiments, anchoring molecules also ensure cell specificity. In some embodiments, anchoring molecules must be attached to the gold nanoparticle core through a polyethylene glycol polymer linker to avoid steric issues close to the membrane. In some embodiments, the linker places the gold nanoparticle at around 13 nanometers from the anchoring molecule to limit the distance between the gold nanoparticles and the cell membrane when the cell labeling procedure is complete.

In preferred embodiments, the linker places the light-to-heat transducer material (e.g., the gold nanoparticle) about 13 nanometers away from the anchoring molecule. In some embodiments, the linker places the light-to-heat transducer material (e.g., the gold nanoparticle) about 10 nanometers away from the anchoring molecule. In some embodiments, the linker places the light-to-heat transducer material (e.g., the gold nanoparticle) about 11 nanometers, or about 12 nanometers, or about 13 nanometers, or about 14 nanometers, or about 15 nanometers, or about 16 nanometers, or about 17 nanometer, or about 18 nanometers, or about 19 nanometers, or about 20 nanometers away from the anchoring molecule. In some embodiments, the linker places the light-to-heat transducer material (e.g., the gold nanoparticle) about 21 nanometers, or about 22 nanometers, or about 23 nanometers, or about 24 nanometers, or about 25 nanometers, or about 26 nanometers, or about 27 nanometers, or about 28 nanometers, or about 29 nanometers, or about 30 nanometers away from the anchoring molecule. In some embodiments, the linker places the light-to-heat transducer material (e.g., the gold nanoparticle) about 25 nanometers, or about 30 nanometers, or about 35 nanometers, or bout 40 nanometers, or about 45 nanometers, or about 50 nanometers, or about 55 nanometers, or about 60 nanometers away from the anchoring molecule. In other embodiments, the linker may place the light-to-heat transducer material greater than 60 nanometers from the anchoring molecule. The distance between the light-to-heat transducer material and the anchoring molecule is critical for the performance of the anchoring property of the complex.

In some embodiments, the light-to-heat transducer material is introduced to the eye of the patient via injection. In some embodiments, the light-to-heat transducer material is injected intravitreally into the posterior chamber of the eye. In other embodiments, the light-to-heat transducer material is injected sub-retinally.

In some embodiments, the light-to-heat transducer material is injected at a dosage of about 10 nM, or about 15 nM, or about 30 nM, or about 60 nM, or about 75 nM or about 100 nM, or about 150 nM. In some embodiments, the light-to-heat transducer material is injected at a dosage ranging from about 5 nM to 200 nM, or about 5 nM to 175 nM, or about 5 nM to 150 nM, or about 5 nM to 125 nM, or about 5 nM to 100 nM, or about 5 nM to 75 nM, or about 5 nM to 50 nM, or about 5 nM to 25 nM, or about 5 nM to 15 nM, or about 5 nM to 10 nM, or about 10 nM to 200 nM, or about 10 nM to 175 nM, or about 10 nM to 150 nM, or about 10 nM to 125 nM, or about 10 nM to 100 nM, or about 10 nM to 75 nM, or about 10 nM to 50 nM, or about 10 nM to 25 nM, or about 10 nM to 15 nM, or about 15 nM to 200 nM, or about 15 nM to 175 nM, or about 15 nM to 150 nM, or about 15 nM to 125 nM, or about 15 nM to 100 nM, or about 15 nM to 75 nM, or about 15 nM to 50 nM, or about 15 nM to 25 nM, or about 25 nM to 200 nM, or about 25 nM to 175 nM, or about 25 nM to 150 nM, or about 25 nM to 125 nM, or about 25 nM to 100 nM, or about 25 nM to 75 nM, or about 25 nM to 50 nM, or about 50 nM to 200 nM, or about 50 nM to 175 nM, or about 50 nM to 150 nM, or about 50 nM to 125 nM, or about 50 nM to 100 nM, or about 50 nM to 75 nM, or about 75 nM to 200 nM, or about 75 nM to 175 nM, or about 75 nM to 150 nM, or about 75 nM to 125 nM, or about 75 nM to 100 nM, or about 100 nM to 200 nM, or about 100 nM to 175 nM, or about 100 nM to 150 nM, or about 100 nM to 125 nM, or about 125 nM to 200 nM, or about 125 nM to 175 nM, or about 125 nM to 150 nM, or about 150 nM to 200 nM, or about 150 nM to 175 nM, or about 175 nM to 200 nM.

In some embodiments, the optocapacitive effect of the present invention described herein works best during the first 300 microseconds after the light stimulus onset. After that, the light conversion into membrane depolarization decreases dramatically. Therefore, in some embodiments, the light stimulation is pulsed (100-300 microsecond pulses) and not continuous. This represents a great advantage for the technique itself in that if the light stimulation is given at a 10 Hz rate (enough for movement representation) the duty cycle of the stimulation pattern will be 0.1-0.3%. These duty cycles give more than 99.5 milliseconds for heat dissipation—so no heat buildup in the retina is expected.

In some embodiments, the light source is pulsed for about 0.01 milliseconds. In some embodiments, the light source is pulsed for about 0.05 milliseconds. In some embodiments, the light source is pulsed for about 0.10 milliseconds. In some embodiments, the light source is pulsed for about 0.20 milliseconds. In some embodiments, the light source is pulsed for about 0.30 milliseconds. In some embodiments, the light source is pulsed for about 0.5 milliseconds. In some embodiments, the light source is pulsed for about 0.8 milliseconds. In some embodiments, the light source is pulsed for about 1 millisecond. In some embodiments, the light source is pulsed for about 2 milliseconds. In some embodiments, the light source is pulsed for about 3 milliseconds. In some embodiments, the light source is pulsed for about 4 milliseconds. In some embodiments, the light source is pulsed for about 5 milliseconds.

In some embodiments, the light source has a duty cycle of about 0.01%. In some embodiments, the light source has a duty cycle of about 0.025%. In some embodiments, the light source has a duty cycle of about 0.05%. In some embodiments, the light source has a duty cycle of about 0.1%. In some embodiments, the light source has a duty cycle of about 0.15%. In some embodiments, the light source has a duty cycle of about 0.2%. In some embodiments, the light source has a duty cycle of about 0.25%. In some embodiments, the light source has a duty cycle of about 0.3%. In some embodiments, the light source has a duty cycle of about 0.35%. In some embodiments, the light source has a duty cycle of about 0.4%. In some embodiments, the light source has a duty cycle of about 0.45%. In some embodiments, the light source has a duty cycle of about 0.5%.

In some embodiments, photoreceptor degeneration causes age-related macular degeneration (AMD). In other embodiments, retinitis pigmentosa (RP) causes photoreceptor degeneration.

The present invention features a method for treating vision loss caused by photoreceptor degeneration in a subject in need thereof. The method may comprise introducing a gold nanoparticle comprising an anchoring molecule to an eye of the patient and pulsing a light source into the eye of the patient.

The present invention may also feature a method of establishing photosensitivity in retina cells in a subject in need thereof. The method may comprise introducing a gold nanoparticle comprising an anchoring molecule to an eye of the patient and pulsing a light source into the eye of the patient.

In some embodiments, the gold nanoparticle is spherical. In other embodiments, the gold nanoparticle is cylindrical (see Table 1).

TABLE 1

| Gold nanoparticles (spheres (i.e., GNP) and cylinders (i.e., GNR) preparations. | | |
|---|---|---|
| | GNP | GNR |
| Aspect | Spherical | Cylindrical |
| Dimensions (nm) | 20 (diameter) | 25 × 90 nm (diameter × length) |
| Peak SPR wavelength (nm) | 520 | 808 |
| Laser diode wavelength (nm) | 520 | 808 |
| Conjugates | | a) Antibodies against Neurofascin b) Antibodies against Thy-1 c) Cholesterol |
| Intravitreal dosages (2 µl volume; molar concentration in nM) | | 10, 30, 100 and 150 |

Without wishing to limit the present invention to any theory or mechanism, it is believed that spherical gold nanoparticles advantageously provide for a material that can absorb visible light with an effect called plasmonic absorption, which boosts light absorption. In some embodiments, gold nanoparticles' light absorption is enhanced by plasmonic resonance, an effect that, in practice, increases light absorption by a resonant effect on the gold electrons exerted by the light waves. With this effect, this type of material (or other materials) can cover light absorption in whatever band within the visible band and beyond.

For example, spherical 20-nm gold nanoparticles (i.e., GNP; i.e., a GNP comprising a diameter of 20 nm) absorb light with a peak at around 520 nm, right in the region of what is perceived as green (i.e., visible light). Without wishing to limit the present invention to any theory or mechanism it is believed that 520 nm is the optimal wavelength for the stimulation of a 20-nm GNP (i.e., a GNP comprising a diameter of 20 nm). Larger particles show a red-shifted peak. Cylindrical gold nanoparticles (i.e., GNR) absorb light with a peak that goes from far red to infrared, therefore including near infrared. For example, a cylindrical gold nanoparticle measuring 25×98 nm (aspect ratio of about 4) shows a peak light absorption at around 800 nm. In some embodiments, gold nanoparticles described herein convert the energy of absorbed photons into heat photons (~11 microns) that start to be emitted in about a femtosecond after light absorption.

In some embodiments, the gold nanoparticle is about 20 nm in diameter (i.e., 20-nm GNP). In some embodiments, the gold nanoparticle is about 15 nm in diameter (i.e., 15-nm GNP). In some embodiments, the gold nanoparticle is about 10 nm in diameter (i.e., 10-nm GNP). In some embodiments, the gold nanoparticle is about 25 nm in diameter (i.e., 25-nm GNP). In some embodiments, the gold nanoparticle is about 30 nm in diameter (i.e., 30-nm GNP). In some embodiments, the gold nanoparticle is about 35 nm in diameter (i.e., 35-nm GNP). In some embodiments, the gold nanoparticle is about 40 nm in diameter (i.e., 40-nm GNP). In some embodiments, the gold nanoparticle is about 45 nm in diameter (i.e., 45-nm GNP). In some embodiments, the gold nanoparticle is about 50 nm in diameter (i.e., 50-nm GNP).

Without wishing to limit the present invention to any theories or mechanisms, it is believed that by using gold nanorods (i.e., GNR), one can successfully produce the optocapacitance effect with an 808-nm laser source, a photon with much less energy and therefore with much less potential to create damage to the retina such as reactive oxygen species generation.

In some embodiments, the gold nanoparticle comprises an anchoring molecule. In some embodiments, the anchoring molecule is a primary antibody. In some embodiments, the primary antibody is against a membrane protein expressed by a target cell. In some embodiments, the primary antibody is against neurofascin. In other embodiments, the primary antibody is against Thy-1 (Thy-1 Cell Surface Antigen). In some embodiments, the target cell is retinal ganglion cells (RGCs). In some embodiments, target cells are alive (i.e., living) and functional. In some embodiments, the RGCs are alive (i.e., living) and functional. In other embodiments, the target cell is transformed to be a function photoreceptor (i.e., a photoactive receptor). In some embodiments, the RCGs are transformed to be a function photoreceptor (i.e., a photoactive receptor). In other embodiments, the target cell is a bipolar cell (e.g., bipolar cells in the retina). In other embodiments, the anchoring molecule is cholesterol.

Without wishing to limit the present invention, it is believed that when cholesterol is attached to a gold nanoparticle, the gold nanoparticle comprising an anchoring molecule (i.e., cholesterol) will enter the membrane and keep the gold nanoparticle close to the membrane for light stimulation.

In some embodiments, the anchoring molecule is attached to the gold nanoparticle via a linker. In some embodiments, the linker is a polyethylene glycol (PEG) linker. In some embodiments, the linker is a polyethylene glycol polymer linker. In other embodiments, the linker is a polyethylene glycol polymer linker. In some embodiments, the link is polyethylene glycol 2000 (PEG 2000).

In some embodiments, the linker places the gold nanoparticle (e.g., a spherical gold nanoparticle or a cylindrical gold nanoparticle) about 10 nanometers away from the anchoring molecule. In some embodiments, the linker places the gold nanoparticle about 11 nanometers, or about 12 nanometers, or about 13 nanometers, or about 14 nanometers, or about 15 nanometers, or about 16 nanometers, or about 17 nanometers, or about 18 nanometers, or about 19 nanometers or about 20 nanometers away from the anchoring molecule. In some embodiments, the linker places the gold nanoparticle at about 21 nanometers, or about 22 nanometers, or about 23 nanometers, or about 24 nanometers, or about 25 nanometers, or about 26 nanometers, or about 27 nanometers, or about 28 nanometers, or about 29 nanometers, or about 30 nanometers away from the anchoring molecule. In some embodiments, the linker places the gold nanoparticle about 35 nanometers, or about 40 nanometers, or about 45 nanometers, or about 50 nanometers, or about 55 nanometers, or about 60 nanometers away from the anchoring molecule. In other embodiments, the linker may place the light-to-heat transducer material greater than 60 nanometers from the anchoring molecule.

In some embodiments, for targeting retinal ganglion cells with gold nanoparticles, a simple intravitreal injection into the patient's eye, of a gold nanoparticles preparation (i.e., conjugated gold nanoparticles in physiologic saline) is sufficient. Twenty-four hours after the injection, the fraction of retinal ganglion cells attached to gold nanoparticles will be sufficient to generate light perception, bypassing degenerated photoreceptors.

In some embodiments, the gold nanoparticles are introduced to the eye of the patient via injection. In some embodiments, the gold nanoparticles are injected intravitreally into the posterior chamber of the eye. In other embodiments, the gold nanoparticles are injected sub-retinally.

In some embodiments, the gold nanoparticles are injected at a dosage of about 10 nM, or about 15 nM, or about 30 nM, or about 60 nM, or about 75 nM or about 100 nM, or about 150 nM. In some embodiments, the gold nanoparticles are injected at a dosage ranging from about 5 nM to 200 nM, or about 5 nM to 175 nM, or about 5 nM to 150 nM, or about 5 nM to 125 nM, or about 5 nM to 100 nM, or about 5 nM to 75 nM, or about 5 nM to 50 nM, or about 5 nM to 25 nM, or about 5 nM to 15 nM, or about 5 nM to 10 nM, or about 10 nM to 200 nM, or about 10 nM to 175 nM, or about 10 nM to 150 nM, or about 10 nM to 125 nM, or about 10 nM to 100 nM, or about 10 nM to 75 nM, or about 10 nM to 50 nM, or about 10 nM to 25 nM, or about 10 nM to 15 nM, or about 15 nM to 200 nM, or about 15 nM to 175 nM, or about 15 nM to 150 nM, or about 15 nM to 125 nM, or about 15 nM to 100 nM, or about 15 nM to 75 nM, or about 15 nM to 50 nM, or about 15 nM to 25 nM, or about 25 nM to 200 nM, or about 25 nM to 175 nM, or about 25 nM to 150 nM, or about 25 nM to 125 nM, or about 25 nM to 100 nM, or about 25 nM to 75 nM, or about 25 nM to 50 nM, or about 50 nM to 200 nM, or about 50 nM to 175 nM, or about 50 nM to 150 nM, or about 50 nM to 125 nM, or about 50 nM to 100 nM, or about 50 nM to 75 nM, or about 75 nM to 200 nM, or about 75 nM to 175 nM, or about 75 nM to 150 nM, or about 75 nM to 125 nM, or about 75 nM to 100 nM, or about 100 nM to 200 nM, or about 100 nM to 175 nM, or about 100 nM to 150 nM, or about 100 nM to 125 nM, or about 125 nM to 200 nM, or about 125 nM to 175 nM, or about 125 nM to 150 nM, or about 150 nM to 200 nM, or about 150 nM to 175 nM, or about 175 nM to 200 nM The present invention (i.e. optocapacitance) features methods that can restore light sensitivity in retinas after photoreceptors degeneration. The present invention comprises injecting gold nanoparticles intravitreally into the posterior chamber of the eye. In some embodiments, gold nanoparticles would be conjugated with anchoring molecules strategically selected to target the membranes of retinal ganglion cells (RGC). The goal of the methods described herein is to make these cells sensitive to light. In some embodiments, the anchoring molecules are specific antibodies or cholesterol molecules that incorporate into the lipid phase of the RGCs' cell membranes. With specific antibodies, cell type resolution can be achieved, which is required for useful vision. Methods described herein can target, without genetics, any cell type in the retina, being useful in various care settings. In the case of cholesterol being used as anchoring molecules, other cells may be also labeled by the gold nanoparticle injected intravitreally, however since RGCs are the great majority of the retina cells in direct contact with the posterior chambers, it is expected that the labeling occurs mainly on RGCs' membranes. In addition, the light-absorbing material can also be delivered to the space behind the retina, a subretinal injection, to target other cell types in the retina with the same end goal that is to create photoreceptors surrogates after photoreceptor degeneration.

In some embodiments, the present invention may also feature a method of transforming a target cell into a functional photoreceptor. As used herein, a "functional photoreceptor" refers to a healthy photoreceptor, i.e., a cell that responds to light by generating an electrical signal inside the retina. In some embodiments, the method comprises introducing a gold nanoparticle comprising an anchoring molecule to an eye of the subject and pulsing a light source into the eye of the subject. In some embodiments, the pulsing light is absorbed by the gold nanoparticle and stimulates a change in membrane capacitance to elicit a cell signal. In some embodiments, the target cell is a living cell. In other embodiments, the target cell is a retinal ganglion cell (RGC).

In some embodiments, the present invention may also feature a method of transforming a living retinal ganglion cell (RGC) into a photoactive receptor. In some embodiments, the method comprises introducing a gold nanoparticle comprising an anchoring molecule to an eye of the subject and pulsing a light source into the eye of the subject. In some embodiments, the pulsing light is absorbed by the gold nanoparticle and stimulates a change in membrane capacitance to elicit a cell signal.

EXAMPLE

The following is a non-limiting example of the present invention. It is to be understood that said example is not intended to limit the present invention in any way. Equivalents or substitutes are within the scope of the present invention.

Vision restoration through gold nanoparticles: The present invention features therapeutic strategies for visual restoration via optocapacitive (see FIGS. 2A and 2B). Briefly, the methods described herein comprise the delivery of gold nanoparticles (GNPs) to the intravitreal space of an affected individual's eyes (FIG. 2A), and the subsequent association of these GNPs to the membranes of retinal ganglion cells, the centrally-projecting neurons responsible for conveying light information to the brain (FIG. 2B). By the rapid heating of these GNPs with an appropriate wavelength and duration of concentrated laser light, ganglion cell depolarization can be achieved with tight spatial and temporal control. A line of triple knockout (TKO) mice were utilized for the experiments presented herein. These mice lack three core genes that play integral roles in the three main phototransduction pathways of the retina, effectively rendering them completely blind except under very specific dim-light conditions. FIG. 3 outlines the 4 groups of animals that were compared: wild-type C57Bl/6J mice served as controls and did not receive any injection of GNPs. TKO mice were split into three groups: 1) those that did not receive any injections, and those that received an intravitreal injection of GNPs to the left eye and were tested at 2) 24 hours post-injection, or (3) 48 hours post injection. In order for GNPs to effectively depolarize neurons when stimulated with light, they must be concentrated in sufficient numbers very close to the plasma membrane, at distances on the order of nanometers. If GNPs are too few or are too far away, not sufficient heat will hit the membrane in an effective fashion to quickly increase membrane temperature and to cause its depolarization and therefore neuronal activation. To achieve this close association and to prolong the duration that GNPs are maintained in tissue it is necessary to conjugate GNPs to some sort of binding agent. For the experiments presented herein, GNPs that were attached to molecules of cholesterol, which served to anchor them to the lipid bilayers of retinal neurons were used. Testing of visual sensitivity comprised the recording of visually-evoked potentials (VEPs), the presence of which signifies central activation of the visual pathway. In some cases, electroretinograms (ERGs), which reflect the activation of retinal interneurons, were also recorded. All of these recordings were performed under light-adapted conditions, which are known to suppress any residual photosensitivity in TKO mice.

In FIG. 4 representative VEPs elicited by a 0.1 ms 520 nm laser stimulus are presented. The wild-type C57 mouse exhibits a typical VEP waveform, exhibiting distinct P1, N1, and P2 components. In the case of a TKO mouse that has not received any injection of GNPs, no VEP is discernible. Six of these untreated TKO mice were recorded and all of the TKO mice failed to elicit a VEP in any of them. In stark contrast, in a TKO mouse that has received GNPs, at either 24 h or 48 h post injection, there are robust VEPs that resemble those recorded in WT animals. Quantification of VEP amplitude (FIG. 4, top right) shows that the magnitude of VEPs in mice 24 hours after injection of GNPs are comparable to those recorded in C57 mice, and in some animals may even be enhanced. These VEPs seem to be relatively stable, as they are still robust at 48 hours post-injection. Interestingly, the kinetics of VEPs recorded in TKO mice (FIG. 4, bottom right) appear to be slightly delayed compared to those recorded in C57 mice. It is unclear whether this is attributable to the unique mechanism of optocapacitive depolarization of ganglion cells or is simply the result of altered visual development in TKO mice. Regardless, the restoration of VEPs to TKO mice signifies the activation of the visual cortex in these animals from light-induced activation of retinal afferents. This suggests that these animals likely possess some form of light-adapted visual perception after treatment with GNPs.

To further characterize the retinal origin of these VEPs, ERGs were recorded in C57, uninjected TKO, and injected TKO mice. FIG. 5 shows representative traces obtained in each group. In C57 mice, a large waveform consisting of the typical A- and B-wave is clearly visible, which suggests photoreceptor and bipolar cell activation. Also, present along the rising edge of the B-wave are oscillatory potentials, reflecting the activity of inhibitory interneuron populations of the retina. In stark contrast to this, no ERG waveform was detectable in traces from TKO mice, regardless of whether GNPs had been injected. This provides good evidence that the VEPs recorded in these animals are the result of specific interactions between the GNPs and ganglion cells and suggests that intravitreal injection of GNPs likely provides the means for restoring visual sensitivity to ganglion cells without the potential complication of concurrent activity of upstream retinal processing.

EMBODIMENTS

The following embodiments are intended to be illustrative only and not to be limiting in any way.

Embodiment 1: A method for treating vision loss caused by photoreceptor degeneration in a subject in need thereof, the method comprising: (a) introducing a light-to-heat transducer material comprising an anchoring molecule to an eye of the subject; and (b) pulsing a light source into the eye of the subject, wherein the pulsing light is absorbed by the light-to-heat transducer material and stimulates a change in membrane capacitance to elicit a cell signal.

Embodiment 2: The method of embodiment 1, wherein the light-to-heat transducer material comprises gold nanoparticles.

Embodiment 3: A method for treating vision loss caused by photoreceptor degeneration in a subject in need thereof, the method comprising: (a) Introducing gold nanoparticles comprising an anchoring molecule to an eye of the subject; and (b) pulsing a light source into the eye of the subject, wherein the pulsing light is absorbed by the gold nanoparticle and stimulates a change in membrane capacitance to elicit a cell signal.

Embodiment 4: The method of any one of embodiments 1-3, wherein the gold nanoparticles comprise a spherical gold nanoparticle, a cylindrical gold nanoparticle, or a combination thereof.

Embodiment 5: The method of any one of embodiments 1-4, wherein the anchoring molecule comprises a primary antibody.

Embodiment 6: The method of embodiment 5, wherein the primary antibody is against a membrane protein expressed by a target cell.

Embodiment 7: The method of embodiment 6, wherein the target cell is retinal ganglion cells (RGCs).

Embodiment 8: The method of embodiment 7, wherein the RGCs are alive and functional.

Embodiment 9: The method of embodiment 8, wherein RGCs are transformed to become functional photoreceptors.

Embodiment 10: The method of any one of embodiments 1-4, wherein the anchoring molecule is cholesterol.

Embodiment 11: The method of any of embodiments 1-10, wherein the anchoring molecule is attached to the light-to-heat transducer material via a linker.

Embodiment 12: The method of any of embodiments 3-10, wherein the anchoring molecule is attached to the gold nanoparticle via a linker.

Embodiment 13: The method of embodiment 11 or embodiment 12, wherein the linker is a polyethylene glycol polymer linker.

Embodiment 14: The method of any of embodiments 1-13, wherein the light-to-heat transducer material is introduced to the eye of the patient via injection.

Embodiment 15: The method of any of embodiments 3-13, wherein the gold nanoparticle is introduced to the eye of the patient via injection.

Embodiment 16: The method of embodiment 14 or embodiment 15, wherein the light-to-heat transducer material is injected intravitreally into the posterior chamber of the eye.

Embodiment 17: The method of embodiment 14 or embodiment 15, wherein the light-to-heat transducer material is injected subretinally.

Embodiment 18: The method of any of embodiments 1-17, wherein the light source is pulsed for 0.30 milliseconds.

Embodiment 19: The method of any one of embodiments 1-18, wherein the light source is pulsed for 0.10 milliseconds.

Embodiment 20: The method of any one of embodiments 1-19, wherein the light source has a duty cycle of 0.1%.

Embodiment 21: The method of any one of embodiments 1-20, wherein the light source has a duty cycle of 0.3%.

Embodiment 22: The method of any one of embodiments 1-21, wherein the cell signal is a synaptic signal.

Embodiment 23: The method of any one of embodiments 1-21, wherein the cell signal is an action potential.

Embodiment 24: A method of establishing photosensitivity of retina cell in a subject in need thereof, the method comprising: (a) introducing a light-to-heat transducer material comprising an anchoring molecule to an eye to the subject; and (b) pulsing a light source into the eye of the subject, wherein the pulsing light is absorbed by the light-to-heat transducer material and stimulates a change in membrane capacitance to elicit an action potential.

Embodiment 25: The method of embodiment 24, wherein the light-to-heat transducer material comprises gold nanoparticles.

Embodiment 26: A method of establishing photosensitivity of retina cell in a subject in need thereof, the method comprising: (a) introducing gold nanoparticles comprising an anchoring molecule to an eye to the subject; and (b) pulsing a light source into the eye of the subject, wherein the pulsing light is absorbed by the gold nanoparticle and stimulates a change in membrane capacitance to elicit an action potential.

Embodiment 27: The method of any one of embodiments 24-26, wherein the gold nanoparticles comprise spherical gold nanoparticles, cylindrical gold nanoparticles, or a combination thereof.

Embodiment 28: The method of any one of embodiments 24-27, wherein the anchoring molecule is a primary antibody.

Embodiment 29: The method of embodiment 28, wherein the primary antibody is against a membrane protein expressed by target cells.

Embodiment 30: The method of embodiment 29, wherein the target cells comprise retinal ganglion cells (RGCs).

Embodiment 31: The method of embodiment 30, wherein RGCs are transformed to become a functional photoreceptor.

Embodiment 32: The method of any one of embodiments 24-27, wherein the anchoring molecule is cholesterol.

Embodiment 33: The method of any one of embodiments 24-32, wherein the anchoring molecule is attached to the light-to-heat transducer material via a linker.

Embodiment 34: The method of any one of embodiments 26-32, wherein the anchoring molecule is attached to the gold nanoparticle via a linker.

Embodiment 35: The method of embodiment 33 or embodiment 34, wherein the linker comprises a polyethylene glycol polymer linker.

Embodiment 36: The method of any one of embodiments 24-35, wherein the light-to-heat transducer material is introduced to the eye of the patient via injection.

Embodiment 37: The method of any one of embodiments 26-35, wherein the gold nanoparticles are introduced to the eye of the patient via injection.

Embodiment 38: The method of embodiment 36 or embodiment 37, wherein the gold nanoparticles are injected intravitreally into the posterior chamber of the eye.

Embodiment 39: The method of embodiment 36 or embodiment 37, wherein the gold nanoparticles are injected subretinally.

Embodiment 40: The method of any one of embodiments 24-39, wherein the light source is pulsed for 0.01 to 0.30 milliseconds.

Embodiment 41: The method of any one of embodiments 24-40, wherein the light source has a duty cycle of 0.01 to 0.3%.

Embodiment 42: A method of transforming a target cell into a functional photoreceptor, the method comprising: (a) introducing a light-to-heat transducer material comprising an anchoring molecule to an eye of the subject; and (b) pulsing a light source into the eye of the subject, wherein the pulsing light is absorbed by the light-to-heat transducer material and stimulates a change in membrane capacitance to elicit a cell signal.

Embodiment 43: The method of embodiment 42, wherein the light-to-heat transducer material comprises gold nanoparticles.

Embodiment 44: A method of transforming a target cell into a functional photoreceptor, the method comprising: (a) introducing gold nanoparticles comprising an anchoring molecule to an eye of the subject; and (b) pulsing a light source into the eye of the subject, wherein the pulsing light is absorbed by the gold nanoparticle and stimulates a change in membrane capacitance to elicit a cell signal.

Embodiment 45: The method of any one of embodiments 42-44, wherein the gold nanoparticles comprise a spherical gold nanoparticle, a cylindrical gold nanoparticle, or a combination thereof.

Embodiment 46: The method of any one of embodiments 42-45, wherein the target cell is a living cell.

Embodiment 47: The method of any one of embodiments 42-46, wherein the target cell comprises a retinal ganglion cell (RGC).

Embodiment 48: A method of transforming a living retinal ganglion cell (RGC) into a photoactive receptor, the method comprising: (a) introducing a light-to-heat transducer material comprising an anchoring molecule to an eye of the subject; and (b) pulsing a light source into the eye of the subject, wherein the pulsing light is absorbed by the light-to-heat transducer material and stimulates a change in membrane capacitance to elicit a cell signal.

Embodiment 49: The method of embodiment 48, wherein the light-to-heat transducer material comprises gold nanoparticles.

Embodiment 50: A method of transforming a living retinal ganglion cell (RGC) into a photoactive receptor, the method comprising: (a) introducing gold nanoparticles comprising an anchoring molecule to an eye of the subject; and (b) pulsing a light source into the eye of the subject, wherein the pulsing light is absorbed by the gold nanoparticle and stimulates a change in membrane capacitance to elicit a cell signal.

As used herein, the term "about" refers to plus or minus 10% of the referenced number. U.S. Pat. No. 10,663,450 is incorporated in its entirety herein by reference.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

What is claimed is:

1. A method for treating vision loss caused by photoreceptor degeneration in a subject in need thereof, the method comprising:
    a) introducing a light-to-heat transducer material comprising an anchoring molecule to an eye of the subject; and
    b) pulsing a light source into the eye of the subject,
        wherein the pulsing light is absorbed by the light-to-heat transducer material and stimulates a change in membrane capacitance to elicit a cell signal.

2. The method of claim 1, wherein the light-to-heat transducer material comprises gold nanoparticles.

3. The method of claim 2, wherein the gold nanoparticles comprise spherical gold nanoparticles, cylindrical gold nanoparticles, or a combination thereof.

4. The method of claim 1, wherein the anchoring molecule comprises a primary antibody.

5. The method of claim 4, wherein the primary antibody is against a membrane protein expressed by target cells.

6. The method of claim 5, wherein the target cells comprises retinal ganglion cells (RGCs).

7. The method of claim 1, wherein the anchoring molecule comprises cholesterol.

8. The method of claim 1, wherein the anchoring molecule is attached to the light-to-heat transducer material via a linker.

9. The method of claim 1, wherein the cell signal comprises a synaptic signal or an action potential.

10. The method of claim 1, wherein the light-to-heat transducer material is introduced to the eye of the patient via injection.

11. The method of claim 10, wherein the light-to-heat transducer material is injected intravitreally into the posterior chamber of the eye.

12. The method of claim 10, wherein the light-to-heat transducer material is injected subretinally.

13. A method of establishing photosensitivity of a retina cell in a subject in need thereof, the method comprising:
    a) introducing a light-to-heat transducer material comprising an anchoring molecule to an eye to the subject; and
    b) pulsing a light source into the eye of the subject,
        wherein the pulsing light is absorbed by the light-to-heat transducer material and stimulates a change in membrane capacitance to elicit an action potential.

14. The method of claim 13, wherein light-to-heat transducer material comprises gold nanoparticles, wherein the gold nanoparticles comprise spherical gold nanoparticles, cylindrical gold nanoparticles, or a combination thereof.

15. The method of claim 14, wherein the anchoring molecule comprises a primary antibody.

16. The method of claim 15, wherein the primary antibody is against a membrane protein expressed by target cells.

17. The method of claim 16, wherein the target cells comprise retinal ganglion cells (RGCs).

18. The method of claim 13, wherein the anchoring molecule is attached to the light-to-heat transducer material via a linker.

19. The method of claim 13, wherein the light-to-heat transducer material is introduced to the eye of the patient via injection.

20. A method of transforming a living retinal ganglion cell (RGC) into a photoactive receptor, the method comprising:
    a) introducing a gold nanoparticle comprising an anchoring molecule to an eye of the subject; and
    b) pulsing a light source into the eye of the subject,
        wherein the pulsing light is absorbed by the gold nanoparticle and stimulates a change in membrane capacitance to elicit a cell signal.

* * * * *